(12) United States Patent
Boveja et al.

(10) Patent No.: US 7,183,947 B1
(45) Date of Patent: *Feb. 27, 2007

(54) SYSTEM AND METHOD OF UTILIZING WIRELESS REMOTE DEVICE FOR COMMUNICATION, ACTIVATION AND CONTROL OF VARIOUS DEFENSE SYSTEMS FOR COUNTERING HOSTILE ACTIVITY ABOARD AN AIRPLANE

(76) Inventors: Birinder R. Boveja, P.O. Box 210095, Milwaukee, WI (US) 53221; Angely Widhany, P.O. Box 210095, Milwaukee, WI (US) 53221

( * ) Notice: Subject to any disclaimer, the term of this patent is extended or adjusted under 35 U.S.C. 154(b) by 174 days.

This patent is subject to a terminal disclaimer.

(21) Appl. No.: 10/784,371

(22) Filed: Feb. 23, 2004

Related U.S. Application Data

(63) Continuation-in-part of application No. 10/007,283, filed on Oct. 22, 2001, now Pat. No. 6,696,928.

(51) Int. Cl.
*G08B 21/00* (2006.01)
(52) U.S. Cl. ............... 340/945; 340/426.12; 340/574; 340/825.72; 244/118.5; 701/9
(58) Field of Classification Search ............... 340/945, 340/963, 426.12, 425.5, 825.69, 426.11, 825.72, 340/574, 540; 244/118.5; 701/3, 9
See application file for complete search history.

(56) References Cited

U.S. PATENT DOCUMENTS

| 3,680,499 A | 8/1972 | Boudreau ............... 109/32 |
| 5,182,541 A | 1/1993 | Bajorek et al. ............ 340/428 |
| 5,531,402 A | 7/1996 | Dahl ..................... 244/75 R |
| 6,584,383 B2 | 6/2003 | Pippenger ................. 701/3 |
| 6,641,087 B1* | 11/2003 | Nelson ................. 244/118.5 |
| 6,657,578 B2* | 12/2003 | Stayton et al. ............ 342/30 |
| 2003/0052798 A1* | 3/2003 | Hanson ................. 340/945 |

* cited by examiner

*Primary Examiner*—Davetta W. Goins

(57) ABSTRACT

System and method of wireless remote control of various defense systems installed aboard an airplane, wherein such defense systems comprise at least one of releasing gases, releasing chemical sprays, fogging, spraying sticky glue, firing laser guns, and sounding alarms. Small easy to conceal, microprocessor based transmitter means communicate with receivers, which are configured and adapted to be part of the control circuitry for the defense measures aboard the airplane. The transmitter means further have bi-directional telemetry means, to facilitate communications among crew members and ground personnel, while hostile situation is likely or is present aboard the aircraft. In one aspect of the invention the transmitter means can also activate auto flight navigation system, if required. The wireless remote control system of the invention can have more than one type of transmitter, with various levels of software lockouts, for different crew members to activate the defense systems.

22 Claims, 17 Drawing Sheets

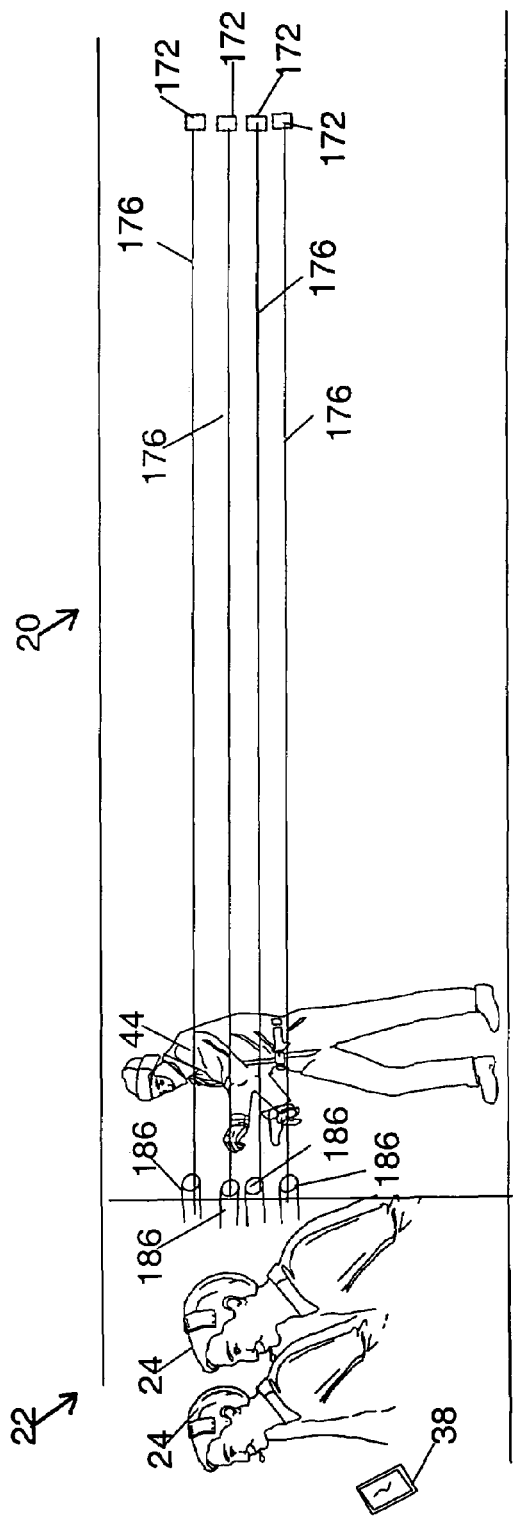
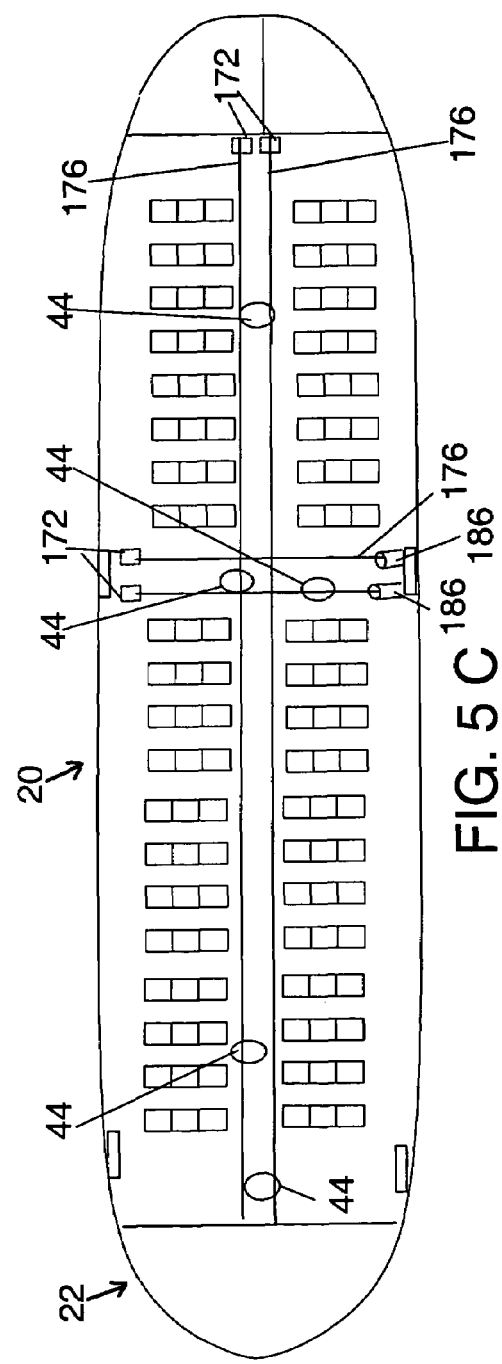
FIG. 5B
FIG. 5C

SYSTEM AND METHOD OF UTILIZING WIRELESS REMOTE DEVICE FOR COMMUNICATION, ACTIVATION AND CONTROL OF VARIOUS DEFENSE SYSTEMS FOR COUNTERING HOSTILE ACTIVITY ABOARD AN AIRPLANE

This is a Continuation-in-Part application of Ser. No. 10/007,283 filed Oct. 22, 2001 now U.S. Pat. No. 6,696,928. Priority is claimed from this application, and the application being incorporated herein by reference.

FIELD OF INVENTION

This invention relates generally to control of anti-hijacking system(s), more specifically a system and method for wirelessly controlling defense systems aboard an airplane comprising aerosol chemical spraying, fogging, spraying sticky glue, firing laser guns, and sounding alarms.

BACKGROUND

Airline security measures have been applied to a large extent at the ground level. Some of the tools that have been used are to have the passengers pass through metal detectors, carry-on baggage being screened via x-ray equipment, and random checks on selected baggage for analysis of trace chemicals. The events which occurred in the United States, on Sep. 11, 2001 namely the hijackers taking control of the aircraft and purposely slamming the airplanes into World Trade Towers and the Pentagon, obviate the need for more drastic defense measures aboard the commercial airliners. This patent application is directed to system and method for countering/foiling hostile activity aboard an airplane and is intended to be used in conjunction with other security and defense methods already in use, such as having plain clothes security marshals aboard the airliners, among other things.

Significant prior art is generally directed to flight and navigation security systems and remote control of such systems. These systems involve disabling manual vehicular controls and automatically take control of flight pattern. Such systems are not suited to security systems involving spraying of gases and fog and other chemicals in airplanes, where each situation is different and requires quick and unique set of anti-hijack measures each time. The prior art does not describe remote wireless control for a system aimed at neutralizing and rendering the perpetrators dysfunctional. Today's world requires more than just auto-pilot flight navigation control and all as described in prior art. A need exits to disable the perpetrators by rendering them dysfunctional or incapacitated as soon as possible, so that they cannot try other destructive means like harming people on board, or blowing up the airplanes in suicidal attempts. It is also required for the defense system to have element of surprise and flexibility. The Applicant's invention is directed for such defense measures.

In considering the prior art, U.S. Pat. No. 3,680,499 assigned to Boudreau, is a mechanical and electrical method employed to activate an incapacitating gas from the mouthpiece of a telephone outside the cabin door. The system is not suited for impacting more than one hi-jacker/perpetrator least of all situations similar to Sep. 11, 2001.

U.S. Pat. No. 6,584,383 B2 assigned to Pipinger is generally directed to a navigation or flight control system where the sensor detected security system takes over flight and navigation of the plane, and involves systems to avoid slamming into buildings or land.

U.S. Pat. No. 5,531,402 (Dahl) is generally directed to a primary or backup system of flight control involving wireless transmitters located outside the plane. In this system a sensor detects a malfunction or damage to main system it then automatically takes over the flight command of the aircraft and disregards manual vehicular changes made. Automatic take over may be suited for navigation but since each hostile activity is unique and different an automatic system is not suited.

U.S. Pat. No. 5,182,541 (Bajorek) is directed to a remote controlled theft deterrent system.

SUMMARY OF INVENTION

The prior art is generally directed to flight control systems to prevent hijackers from navigating the airplane into buildings. It does not disclose method and system to render the hijackers dysfunctional or incapacitated. Other prior art generally pertains to robbery deterrent systems and anti car-jacking devices, which are not well adapted for anti-terrorist activities aboard an airplane. Accordingly, this invention is directed to system and method of using remote means for activating and control of systems like chemical spray systems, releasing gases, fogging systems, laser guns, and alarm systems as described in patent application Ser. No. 10/007,283 filed on Oct. 22, 2001. More specifically, this patent application comprises remotely activating and remotely controlling the different anti-hijacking modalities by use of a customized wireless transmitters sending encoded radio-frequency signals. Additionally, the wireless means can also be used for communication among crew personnel with coded signals, and with ground personnel.

In one aspect of the invention, the wireless remote device can activate and control each of the modalities by pressing a code or sequences of codes.

In another aspect of the invention, the remote operation can be performed in combination or sequentially. For delayed onset of defense system a predetermined program sequence can also be pre-programmed, if required.

In another aspect of the invention, the remote device has communication capabilities between the cockpit, cabin crew, security personnel, and ground operations.

In yet another aspect of the invention, there can be one or more type of transmitters, having various levels of control of defense measures to suit different crew members.

In another aspect of the invention, laser guns which are strategically pointed behind the cockpit door (and other areas in the cabin), can be selectively used by appropriate personnel and under appropriate conditions. These systems can be activated from the control panel within the cockpit, or from anywhere within the plane via a wireless transmitter.

In successfully defending against a terrorist attack it is imperative that multiple modalities are available to the defending team to choose from, and that these modalities can function selectively, or simultaneously, or sequentially. For example, fogging can be used with laser guns, or spraying aerosol chemicals and fogging can be used in combination. As each hostile situation is different in intensity and terrorist's abilities, an adequate defense system requires element of surprise and flexibility of operation.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

DESCRIPTION OF THE INVENTION

The current invention discloses system and method for wirelessly activating and controlling various anti-hijacking defense systems installed aboard an airplane. Applicant's parent patent application Ser. No. 10/007,283 filed Oct. 22, 2001 discloses these various defense measure, installed aboard an aircraft. The disclosure of the various defense measures is reviewed here for convenience. The invention describes a system and method for remotely controlling various systems for foiling/countering hostile attempts with various modalities, ranging from simple alarm sounding systems to the more complex various types of chemical spray system built into the aircraft, and laser guns outside the cockpit door. For the purpose of this disclosure, control is defined as activating, increasing/decreasing the level, turning-off, and communicating among crew members and ground personnel about such defense systems. Any of these systems may also be activated (or turned off) in any combination, by a small, easy to carry, customized wireless activation transmitter system. The wireless system also has communication capabilities as described later.

For practicing the method and system of this invention, under extremely serious situations such as hostile activity aboard the aircraft, the pilot is able to activate one or more system(s) of defense described either from the cockpit, or an appropriate person from the flight crew or an air marshal can also activate one or more of these system(s) from anywhere aboard the aircraft using the remote wireless means. Sectional activation of defense systems is also possible to avoid unnecessary fogging or spraying gases in the whole aircraft. It will be clear from the disclosure that, even though this the invention has been described with reference to an airplane, with slight modifications the invention can also be applied to commercial cruise ships, freight ships, trains, and buses.

Figure 1:
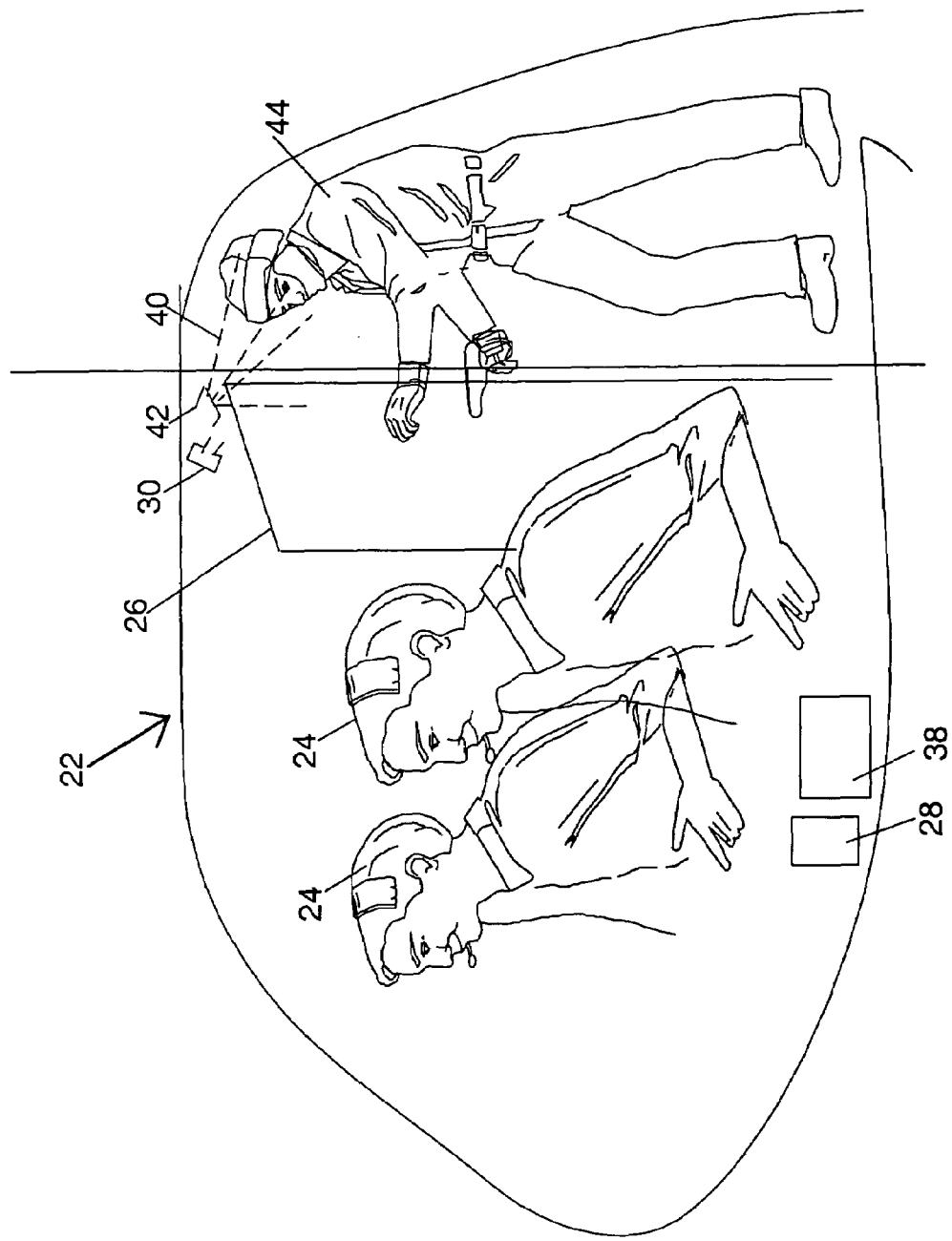
FIG. 1 is a schematic diagram showing fight crew in the cockpit and hijacker outside the cockpit door.
Figure 2A:
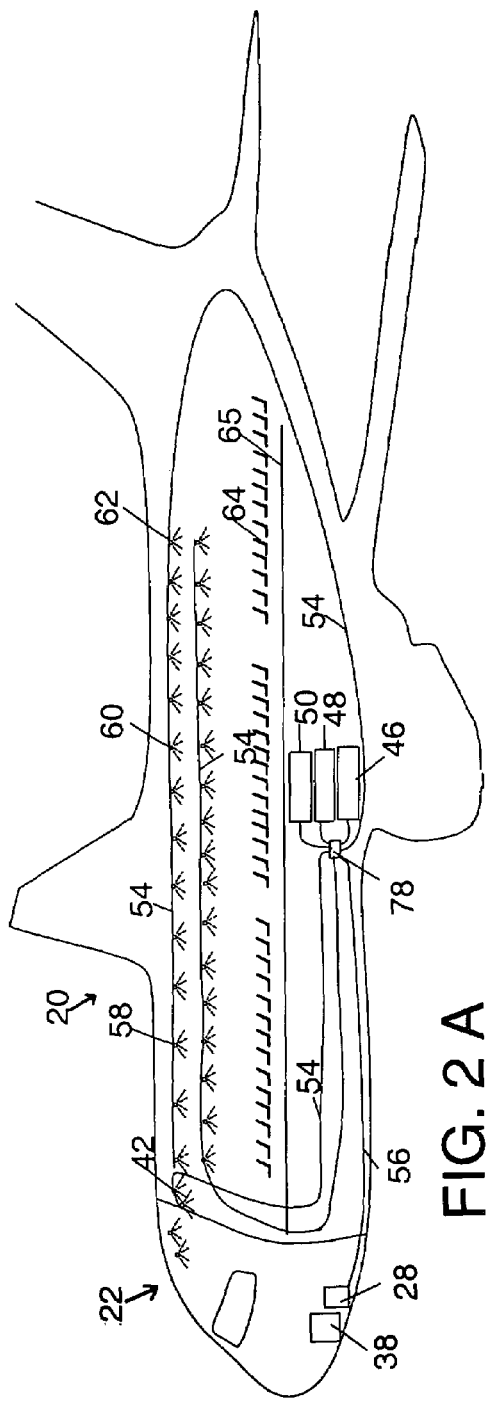
FIG. 2A is a schematic diagram of an airplane showing spray nozzles and cylinders.
Figure 2B:
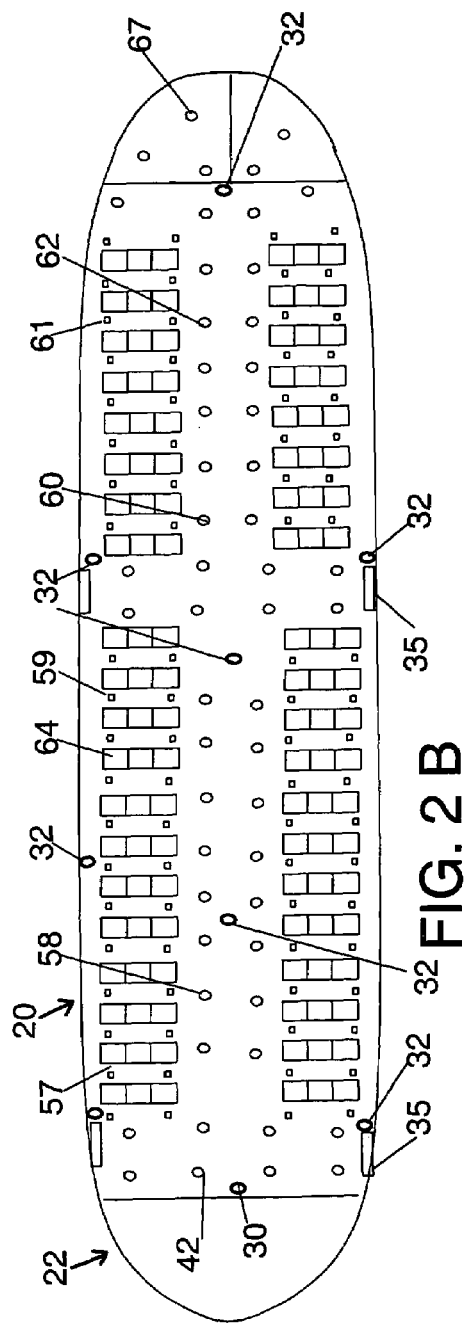
FIG. 2B is a schematic diagram (top-view) of an airplane showing location of spray nozzles.

As shown schematically in FIG. 1, in one aspect of the invention, cameras 30 are located strategically outside the cockpit door (and other cameras 32 in the cabin) enable the cockpit crew 24 to have a view of the passenger cabin area 20. Upon sensing danger, the pilot 24 or another member of the cockpit crew 24, can quickly look into the cabin from the monitor 38 by zooming onto the appropriate camera from the control panel 28, to get a look at the target individuals. If the captain senses danger, he/she communicates to crew personnel using the communication capabilities of the wireless means in code form without calling attention to the hijackers to be ready to put on masks or/and turn "on" the chemical spray from the spray nozzle(s) 42 strategically located outside the cabin door 26. As shown in FIGS. 2A and 2B, the spray outlet nozzles are strategically located overhead behind the cockpit door area 27 and in the cabin 20. For the purposes of dispensing the chemicals, the spray nozzles are broken down into sections, such that the chemicals can be dispensed to selected areas of the plane independently. Therefore with the aid of the cameras, a captain (or crew member) may activate only the area behind the cockpit door 27, or one or multiple sections of the cabin 20, without leaving the cockpit. Upon activation, the camera images can also be recorded on the airplane's flight recorder and/or the "black box".

Since the aim is to temporarily render the hijackers non-functional or dysfunctional, various choices of aerosol chemicals spray, from very benign to very potent chemical are available. Four broad categories of aerosol chemicals can be used for practicing the methods of this invention. The most benign category is smoke or fogging agents, which work by visually blocking an area or sections of the airplane. Other more potent categories are inhalants, general anesthetics, and irritants.

Inhalants, which include a wide variety of breathable chemicals produce mind-altering results. Effects of inhalants varies from one substance to another. One advantage of inhalants is that their effects are felt virtually immediately. The duration of effects depends on the substance used. Effects can last from just a few seconds for some, and up to several hours for others. Persons under the influence of inhalants will get confused and disoriented, and their speech will get slurred.

Low doses of gaseous anesthetic agents may also be used singly, or in combination. The effects of these agents are well understood because of their use in medicine and surgery. Commonly used inhaled anesthetic agents are nitrous oxide (also known as laughing gas), halothane, sevoflurane, desflurane, and isoflurane. Halothane and sevoflurane are the easiest to inhale. Nitrous oxide has the advantage that when used alone is not potent enough to be a complete general anesthetic. When the anesthetic gas is inhaled into the lungs, the blood that travels through the lungs carries the anesthetic gas to the central nervous system. The rate at which the bloodstream takes up the anesthetic is dependent on may factors including the concentration of the inspired gas, the rate of flow of the gas, the solubility of the gas in blood, the rate and depth of breathing, and the amount blood the heart pumps each minute.

Among the anesthetic agents, halothane (chemical name 2-bromo-2-chloro-1,1,1-trifluroethane) $C_2HBrClF_3$, is a colorless, mobile fluid, and has chloroform odor and a sweet taste. Sevoflurane with chemical name fluro-methyl-2,2,2-trifuluoro-1-(trifluromethyl) ethyl ether has the chemical formula of, $C_4H_3F_7O$. Nitrous oxide (chemical formula $N_2O$) for example, is a colorless gas, having a sweetish taste and a pleasant odor and is normally used as a general anesthetic or analgesic agent.

In the irritants category, a host of non-lethal chemicals such as mace, pepper sprays, and tear gases can be used. These agents have extensive experience from crime prevention and crowd control during civil disturbances.

The intent of any such aerosol chemical used would be to temporarily debilitate and render the individuals non-functional who come in contact with such chemicals, without causing permanent or long lasting damage. Therefore the concentration, dose, flow rate, and time of spray would have to factored.

An example of tear gas is a compound known as CS, chemical name Orthochlorobenzylidenemalononitrile $ClC_6H_4CHCCN(CN)_2$. It is a blue colored synthetic agent which has the state of micro-particulate solid and is classified as irritant, lacrimator, sternutator. It produces irritation of the skin, tearing and lacrimation, sneezing, and irritation of the respiratory system. It takes effect in about 3 to 10 seconds, and recovery takes about 10 minutes. Since it is made of solid particles, it must be carried through the air by an agent or expelled in a fine dust. Its odor is rather pungent. CS is most irritating in a humid climate and on a moist skin surface. Anyone who has lost his sense of feeling because of the influence of narcotics or alcohol will not be affected by CS. Other pepper sprays with various concentration of Capasicin (the active ingredient) can also be used.

Yet another non-lethal agent being developed at the Sandia National Laboratory in Alburquerque, N. Mex., known as sticky foam can be used. This foam is so sticky that it can literally stop a suspect in his tracks.

The benign gaseous agents which mearly fog up vision, can be used alone or in conjunction with other deterrents such as burglar alarm type of modalities.

The aerosol content supply of chemicals are appropriately pressurized in cylinders and stored in convenient locations aboard the airplane. The control panel of such a system being located in an appropriate place within the cockpit. The pilot or a member of the flight crew is also able to engage the control panel from anywhere within the aircraft using a wireless transmitter as described later in this application.

As shown in FIG. 2A, cylinders 46, 48, 50 containing the aerosol chemicals are stored in an appropriate location within the airplane. Upon activation from the control panel 28 or wireless transmitter 100, regulator valves allow the gas, or combination of gases to flow via tubes to the pumping system 66 and then to the spray nozzles 42, 57, 58, 59, 60, 61, 62, 67 located throughout the airplane.

As shown in FIG. 2B (top view) the spraying action in the airplane is divided into sections, for example front 58, 57, middle 60, 61, or back 62, 61. Further, sections are divided into aisle and standing areas 42, 57, 59, 61, and 67. The purpose of sectional divisions is to be able to selectively spray, if possible, only the areas of hostile activity. However, if the whole airplane needs to be fogged or chemically sprayed, that can also be done. Another example is that fogging can be done in the whole plane, with the irritant spray only in areas of terrorist concentration. Each section can be activated alone, or simultaneously with other sections, and/or sequentially. Camera(s) 30 and 32 are located outside the cockpit door area 27 and in the cabin passenger areas, respectively. The views from these cameras can be viewed by the cockpit crew on the monitor 38 and help in the selective activation of the modalities.

Figure 3:
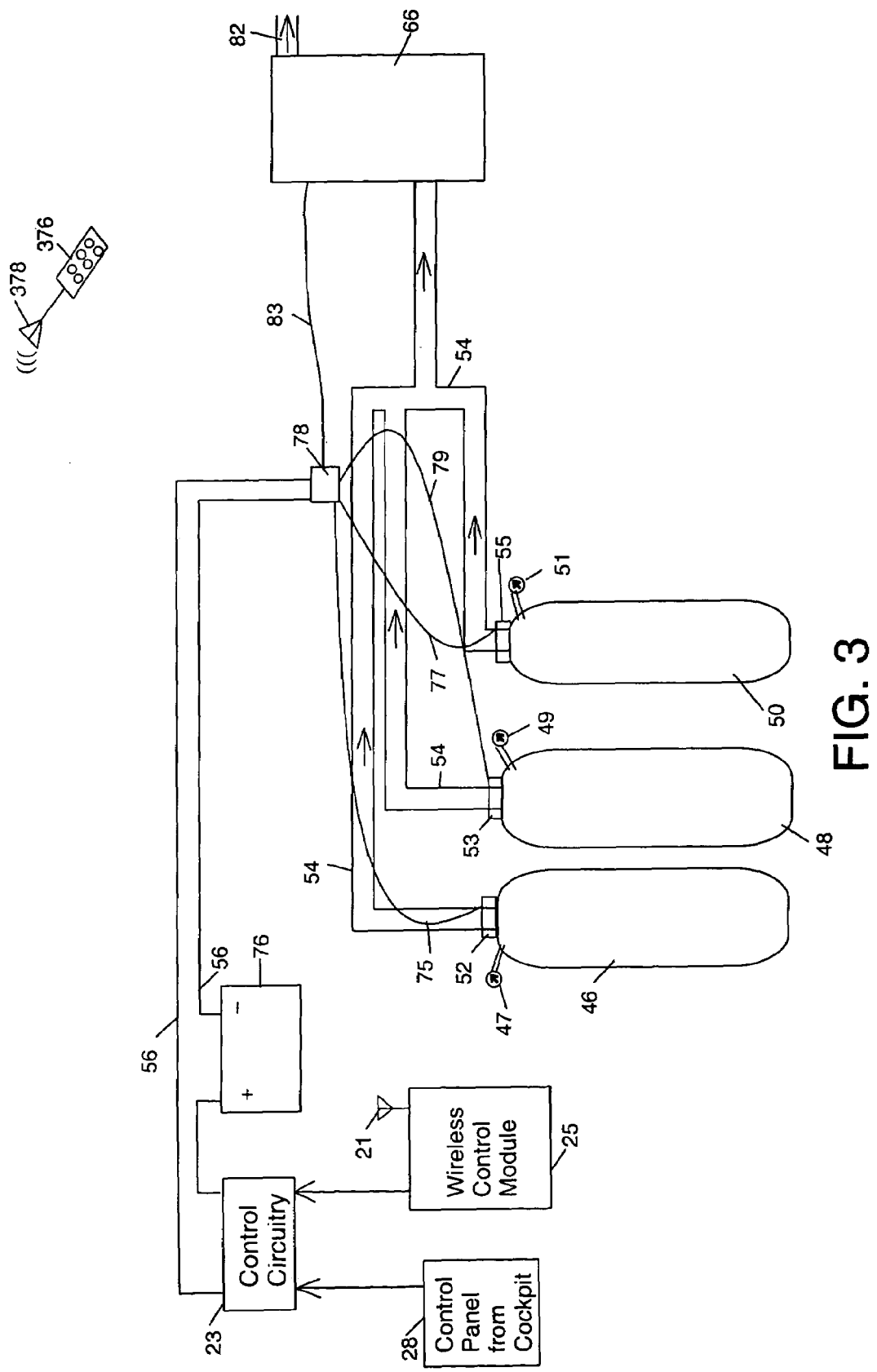
FIG. 3 is a schematic diagram showing the storage and delivery system of the chemicals.

As shown in FIG. 3, the non-lethal incapacitating agents are stored in pressurized containers 46, 48, 50 and are prevented from discharging by solenoid valves 52, 53, 55. Connected to the fluid output of solenoid valves 52, 53, 55 are distribution manifolds 54, which is in communication with discharge manifolds 82. Once solenoid valves 52, 53, 55 are opened, either from the control panel 28 in the cockpit 22 or from the wireless transmitter 100, 106, 376 appropriate chemical agents fill discharge manifolds 82 via distribution manifolds 54 and are dispersed in a predetermined pattern through nozzles distributed within the plane, to effect the individuals standing inside the region defined by the predetermined pattern. The regulation of quantity (flow rate x time) is at the level of control valves 52, 53, 55 from the cylinders 46, 48, 50. The pressure of flow is controlled via pump 66

Pressure monitoring devices 47, 49, 51 (comprising solid-state pressure sensor) monitor pressure in the containers 46, 48, 50. In the event, the pressure in any of the containers 46, 48, 50, goes out of range, appropriate indicators will be lighted on the control panel 28 in the cockpit.

Figure 4:
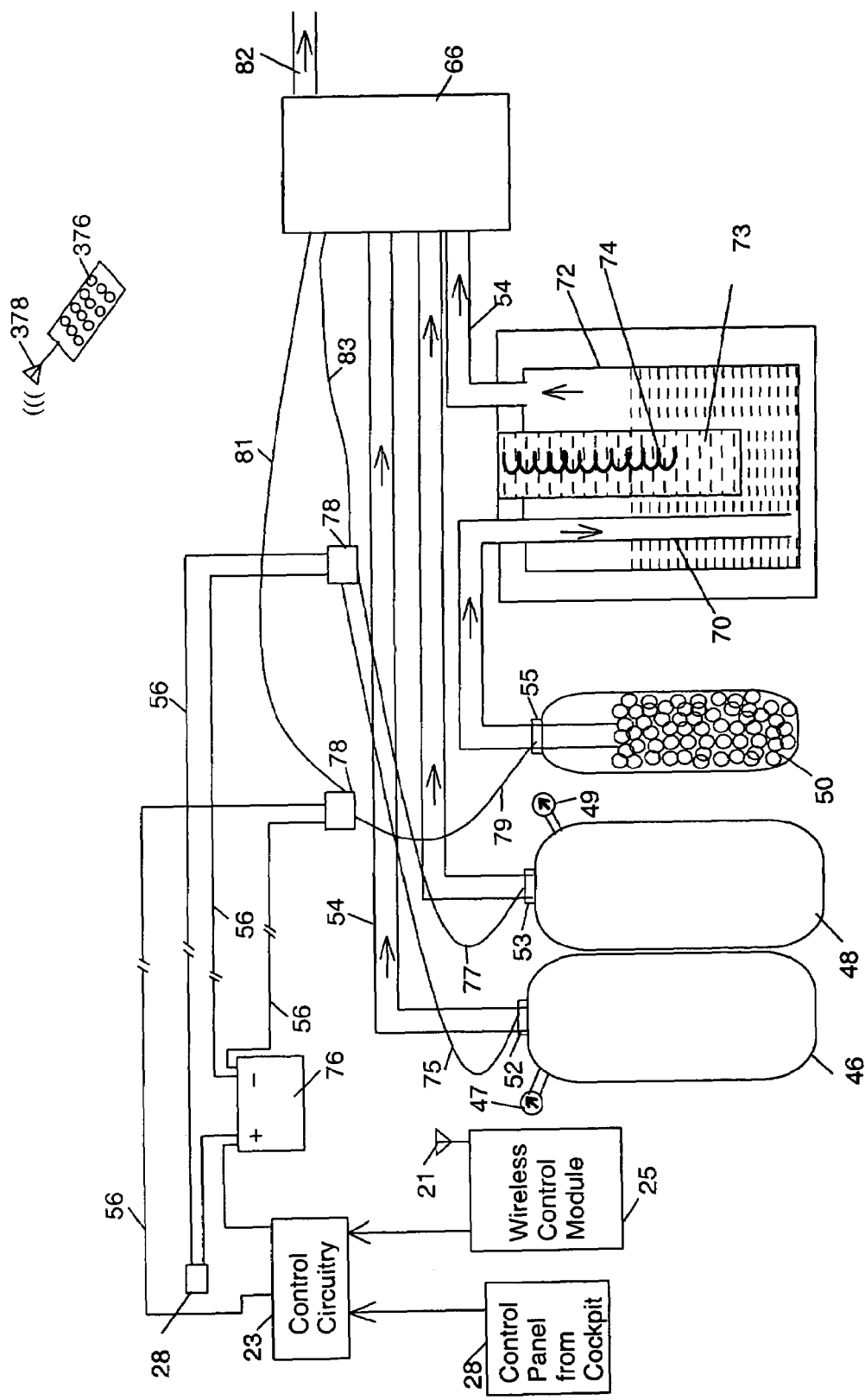
FIG. 4 is a schematic diagram showing the storage and delivery system for smoke and fog.

As disclosed in the parent application, fog can be generated outside the cockpit door (and in the cabin). As shown in FIG. 4, a first vessel 50 is kept at a first temperature and filled with an alcohol mixture. The alcohol mixture comprising approximately 50% propylene, 30% triethylene glycol, and 20% water can be used. A second vessel 72 having a heat exchanger 74 for keeping the second vessel 72 at a higher temperature than the first vessel 50. The pipe 70 connecting the two vessels has a valve 78 mounted for opening the connection between the first vessel 50 and the second vessel 72. The heating element 74 immersed in oil bath 73 can quickly generate fog, thus distributing the fog under pressure into the area behind the cockpit door, or other areas. The valve 78 can be activated from the control panel 28 in the cockpit 22, or via a wireless transmitter 100, 106, 376 from anywhere in the plane 20. A backup battery 76 ensures continuous uninterrupted power supply.

Figure 5:
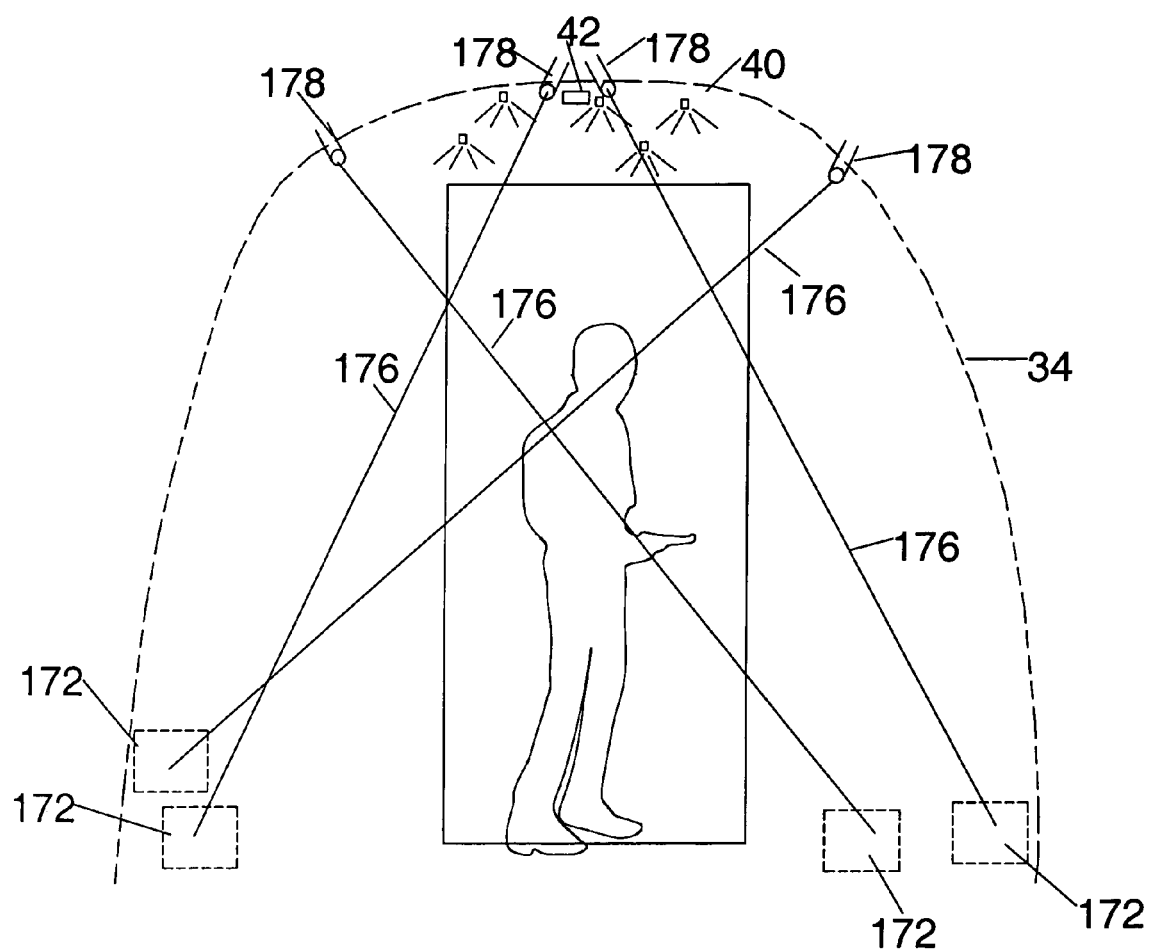
FIG. 5A is a schematic diagram showing the position of laser beams behind the cockpit door.
FIG. 5B is a schematic side-view diagram showing the position of laser beams covering the aisle area in an airplane.
FIG. 5C is a schematic top-view diagram showing the position of laser beams covering the aisle area in an airplane.

As also disclosed in the parent application, laser guns are used separately, or in conjunction with chemical sprays. As shown in FIG. 5A, laser guns 178 can be strategically pointed in the area 27 behind the cockpit door. Laser guns 186 can also be pointed in the aisle, and at a level higher than the seats, as is shown in FIG. 5B. These could be used in the event that only the hijackers are standing in the aisle, and the passengers are seated. There are protective reinforced areas 172 placed in the line of the laser beam 176, to prevent damage to the airplane. Of course, the level of control and password protection would be the highest. These laser guns 178, 186 can be activated via the security control panel 28 or via wireless transmitter 100. These laser guns 178, 186 can also be used in conjunction with the above mentioned fog system or any other aerosol chemicals. The activation and use of the laser guns would be most appropriate for a plain clothes security marshal, if one is on-board during such an extreme event.

Figure 6A:
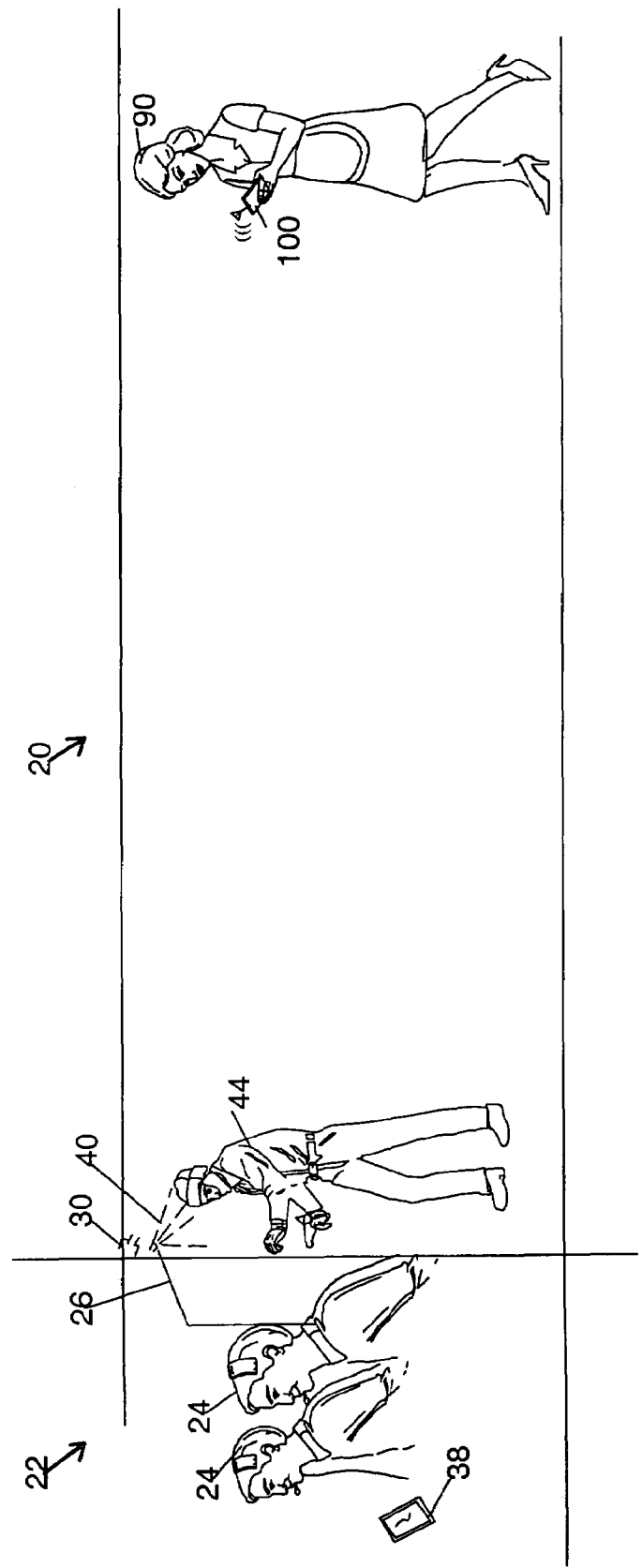
FIGS. 6A and 6B is a schematic diagram showing a flight attendant carrying a wireless activation device, and two-way and three-way coded communication.
Figure 6B:
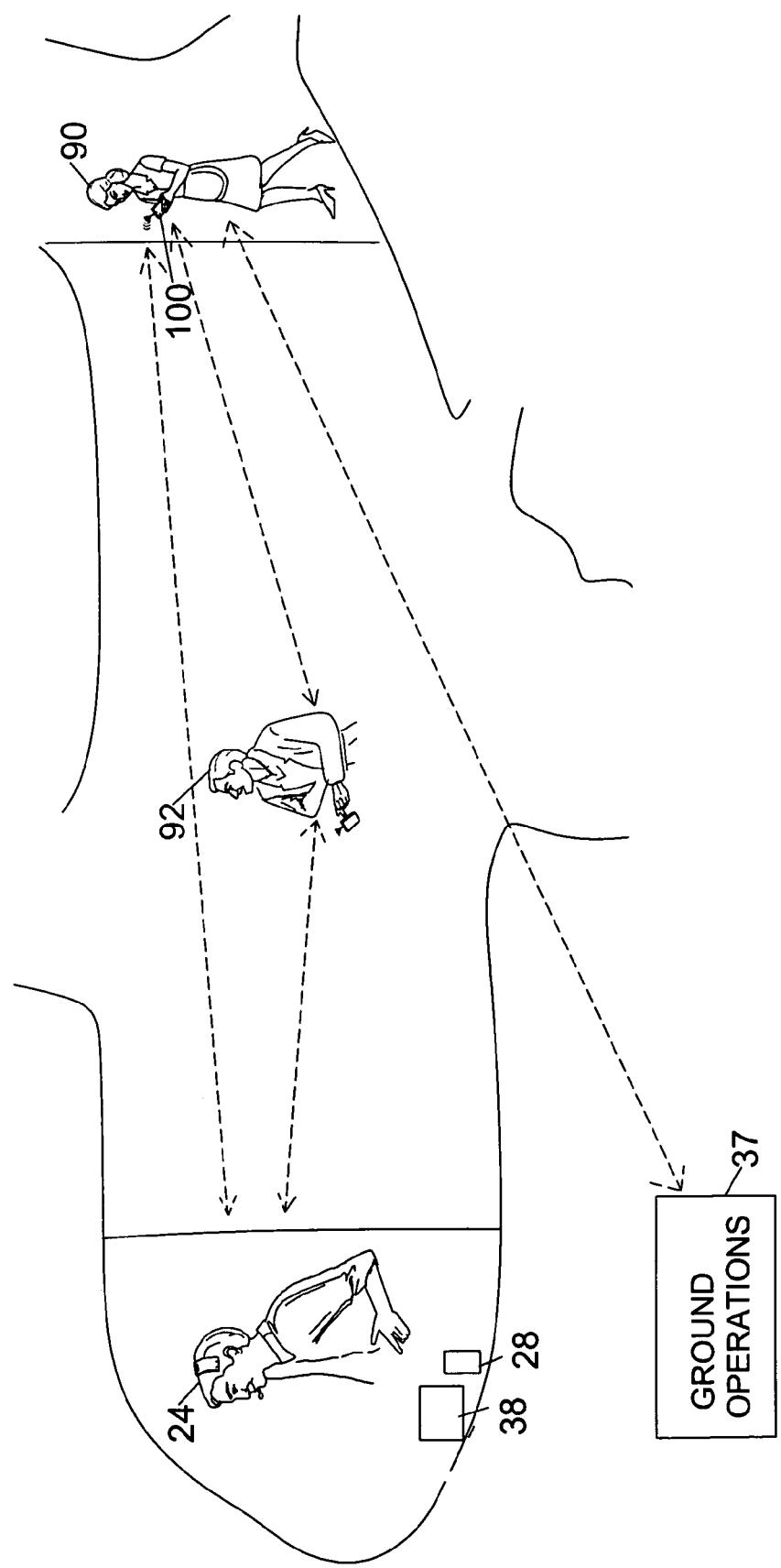

In all of the above defense measures, in addition to controlling the defense systems from the control panel, a small wireless transmitter can be used for control of any modality or a combination of modalities. In this patent application, control implies activation, increasing, decreasing or turning-off of the various defense measures. Shown in conjunction with FIGS. 6A and 6B, a flight attendant is able to wirelessly communicate with the crew in the cockpit 22 (FIG. 6A) or with an air-marshal (FIG. 6B), and under severe conditions is able to activate certain anti-hijacking measures. A two-way or three-way communication is possible with the wireless activation communication device (WCD) 100. For example, as is schematically depicted, a flight attendant, through encoded messages, would simultaneously be able to alert a plain clothes air marshal 92 (if one is present), pilot 24, and ground operations 37 in the event of a hijacking, possible hijacking, or a security threat.

Figure 7:
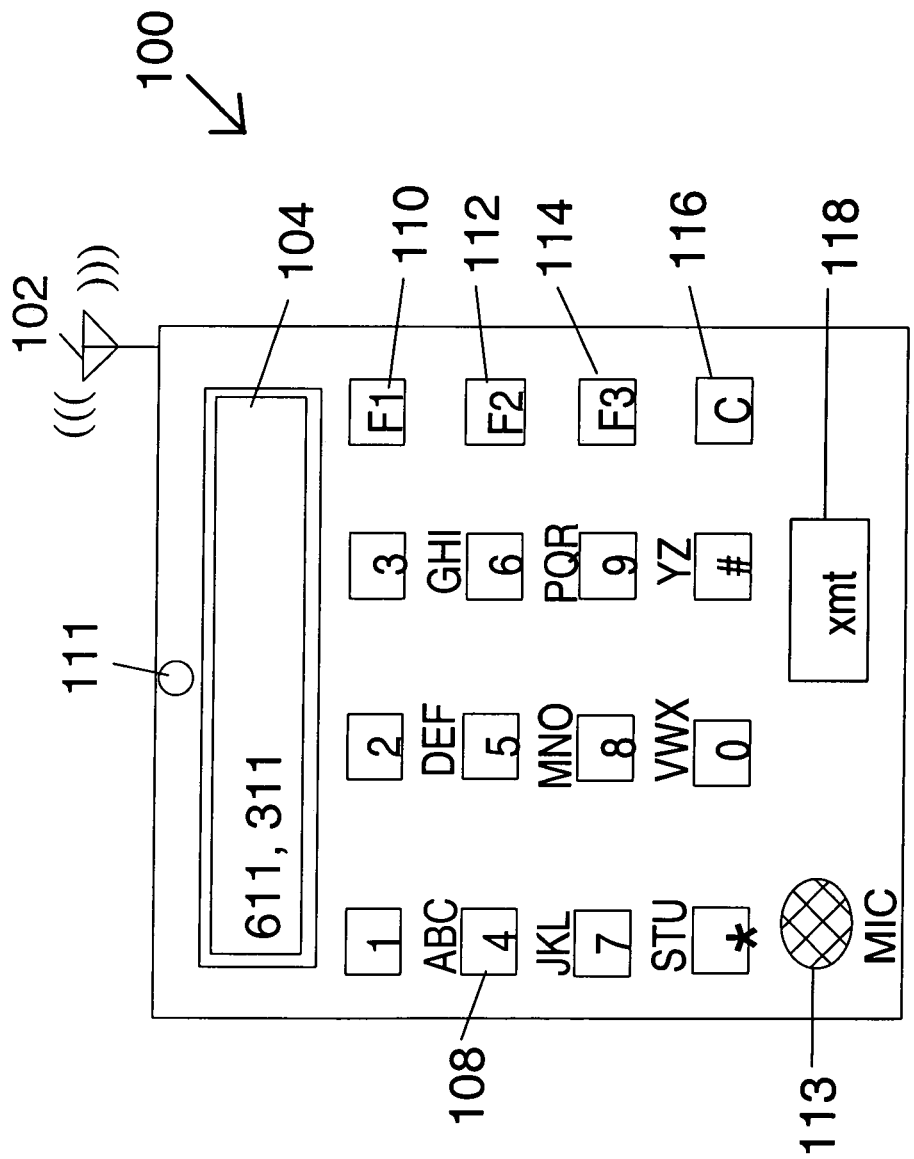
FIG. 7 is a schematic diagram showing close-up of one embodiment of the wireless communication/activation transmitter.

A picture of the wireless activation communication device (WCD) 100 in one aspect is shown in FIG. 7. The (WCD) 100 which looks like a tiny calculator in appearance, is a customized, sophisticated communication and remote activation system. Other versions of the wireless activation communication device (WCD) are shown as 106 and 376. There is some overlap in the functionality of the WCD, therefore sometimes WCD 100, WCD 106, and WCD 376 are sometimes used interchangeably in this patent application Because of its small size, it can easily be concealed in a clothing pocket or in a handbag. The microprocessor based circuitry of the transmitter is adapted such that encoded messages activate appropriate responses. For example, by pressing a predetermined sequence of numbers an appropriate response is activated.

As one example, by pressing a predetermined sequence of numbers, a message is activated at the control tower and ground operation that a serious situation (such as hijacking) is in progress. As another example, by pressing another predetermined sequence of numbers, a message is activated to the crew in the cockpit that a serious situation (such as hijacking) is possible or is in progress. As another example by pressing another predetermined sequence of numbers, a sound alarm system can be activated much like a burglar alarm system in a car. The purpose of such a sound message or alarm would be to startle the hijackers or make their communication process more difficult. The length of the audio message or alarm can be pre-programmed to any length or loudness. Other security systems, such as chemical sprays and laser guns, can also be operated from the wireless transmitter 100, with appropriate lockouts.

The presently preferred embodiment, as shown in FIG. 7, has a small liquid crystal display (LCD) screen, where the encoded messages appear. An example of an encoded message may be 811 or 611, 211, 311. Upon pressing the transmit (XMT) 118 key, an action or a series of actions are securely and reliably activated. The combination of regular keys 108, and several special function keys 110, 112, 114, 116, are used for encoding messages and activation sequences.

Figure 8:
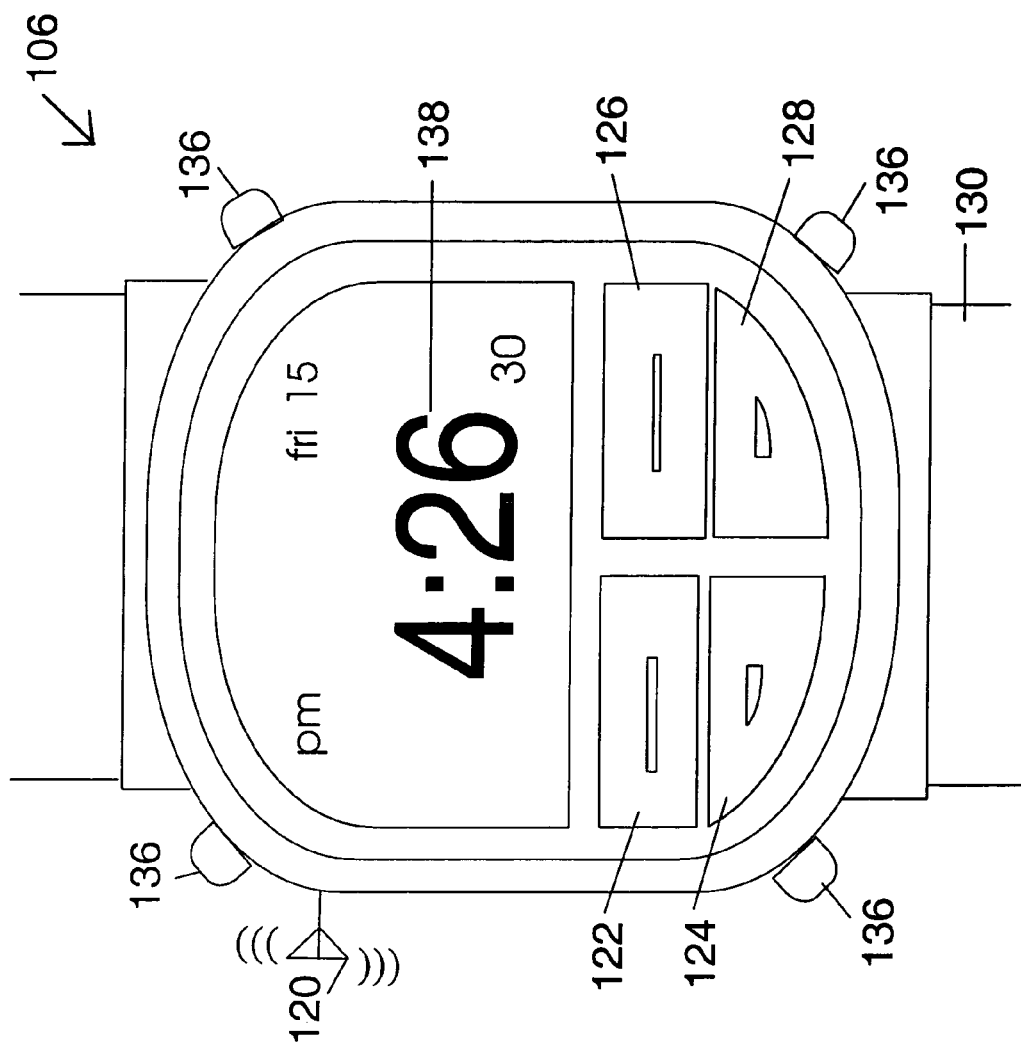
FIG. 8 is diagram showing wireless transmitter incorporated within a wristwatch.

The wireless capability and functionality of the transmitter 100 is also incorporated into a watch-size transmitter 106 in one aspect, as shown in FIG. 8. A series of buttons located on the front and sides of the "watch" 106 are used for encoding the activation of various systems and events.

Figure 9:
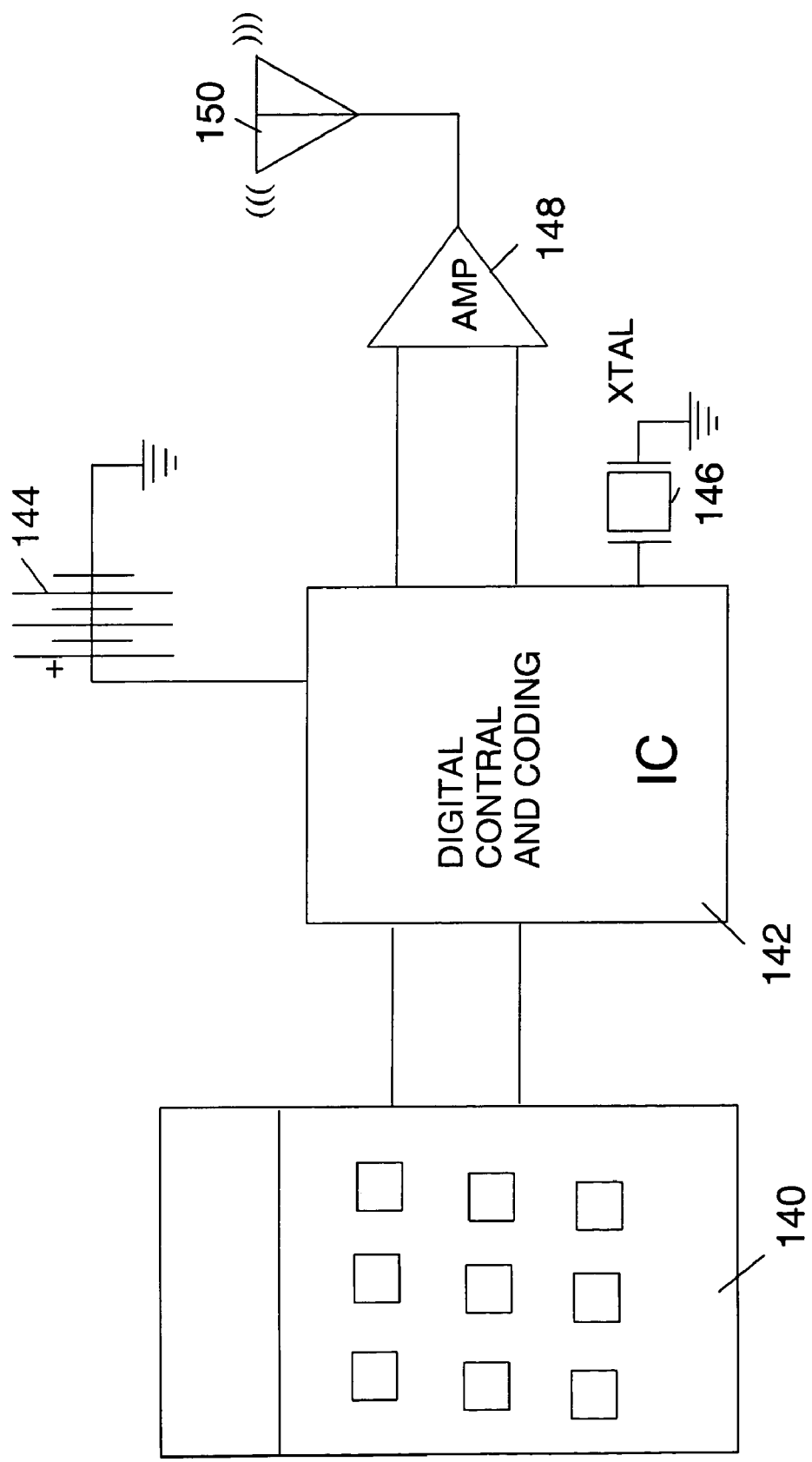
FIG. 9 is a general schematic block diagram of the wireless transmitter.

A simplified schematic diagram of the (WCD) 376 is shown in FIG. 9. Input to the control circuitry 142 is provided by a keypad 140. The output is coded high frequency signals, which are amplified 148, and transmitted via a small antenna 150. Clock signals are provided by crystal oscillator 146 and power to all components is provided by a battery 144.

Figure 10:
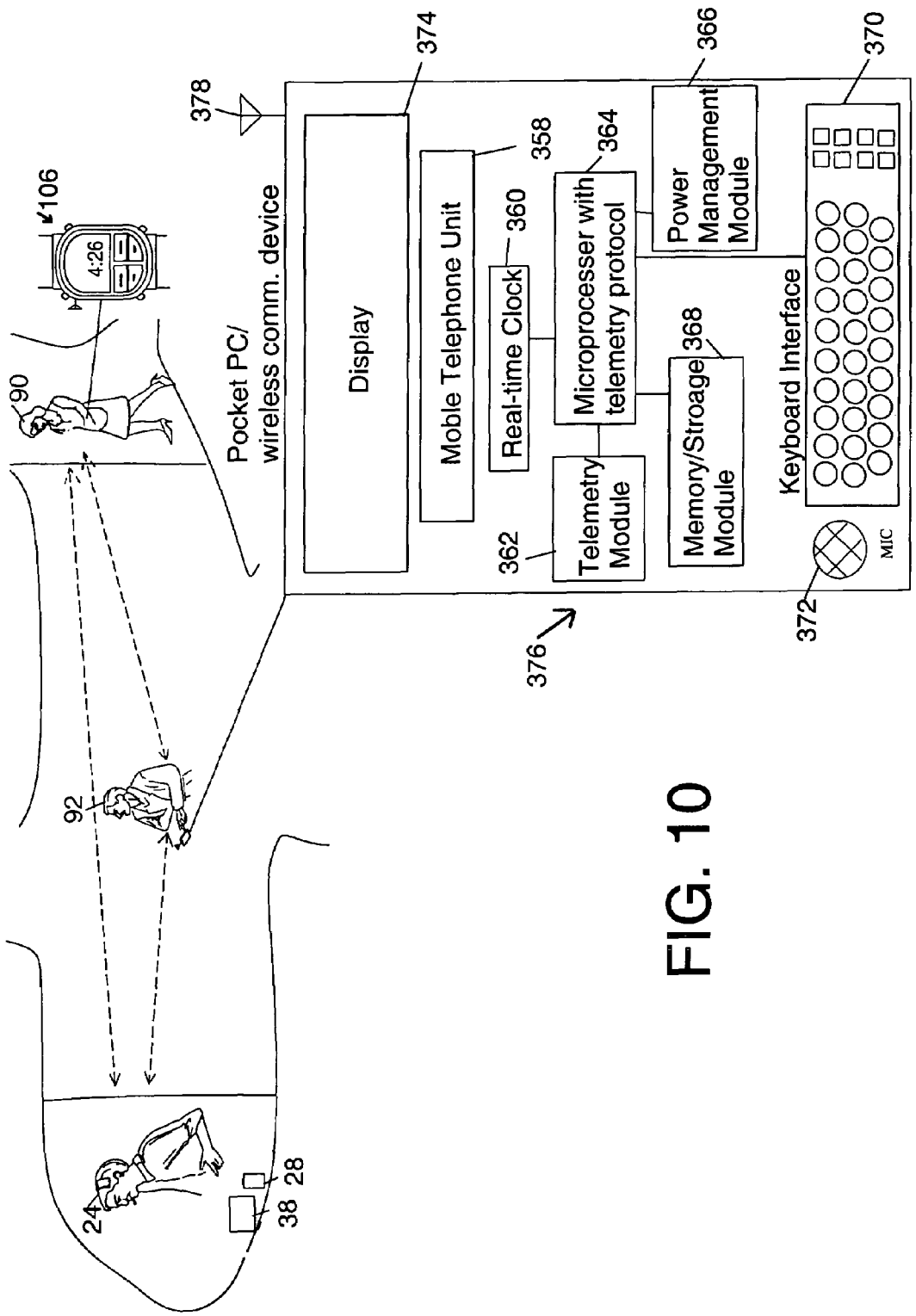
FIG. 10 is a schematic diagram showing a pocket PC/wireless communication device for an air-marshal.
Figure 11:
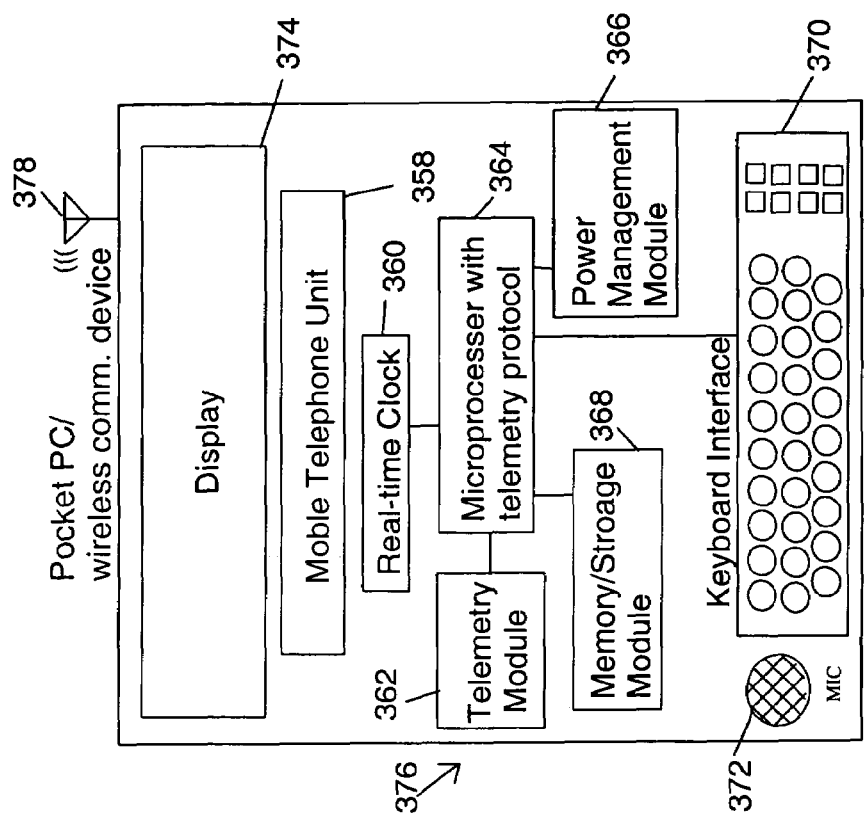
FIG. 11 is a schematic diagram showing various anti-hijacking defense systems that can be controlled with the pocket PC/wireless communication device from anywhere in the plane.
Figure 11:
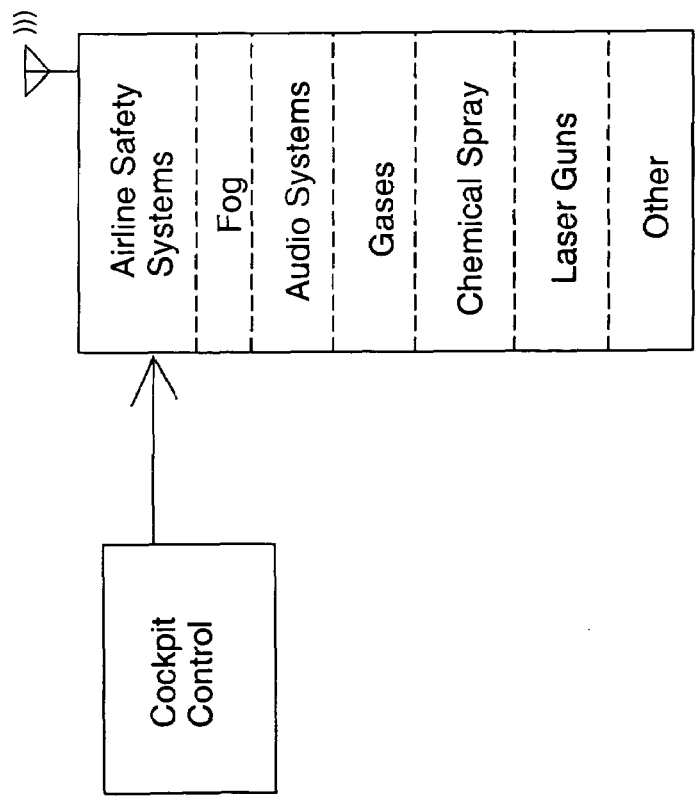

Shown in conjunction with FIG. 10, an air-marshal, if present, also has one embodiment of wireless activation and control device (WCD) 376. Because of the function of the air-marshal, the level of functionality available to an air-marshall is greater than that of the general flight crew. This embodiment of the wireless activation and control device 376 is a modified pocket PC/wireless device, customized and configured to adopt to the current application. Shown in conjunction with FIG. 11, the WCD 376 of the current invention is a microprocessor 364 based pocket or hand-held device with bi-directional telemetric capabilities. Attached to the microprocessor 364 are a number of peripheral devices such as the touch screen, IR port, speaker, memory modules etc, as is well known to one skilled in the art. Also shown in conjunction with FIG. 11, the WCD 376 can activate and control all the defense measures present aboard the aircraft.

The wireless activation and control device (WCD) 376 is configured to accept PCM/CIA cards specially configured to fulfill the role of communication module of the present invention. The wireless activation and control device 376 may operate under any of the useful software including Microsoft Window's based, Linux, Palm OS, Java OS, SYMBIAN, or the like. The telemetry module 362 comprises an RF telemetry antenna 142 coupled to a telemetry transceiver and antenna driver circuit board which includes a telemetry transmitter and telemetry receiver. The telemetry transmitter and receiver are coupled to control circuitry and registers, operated under the control of microprocessor 364.

Figure 12:
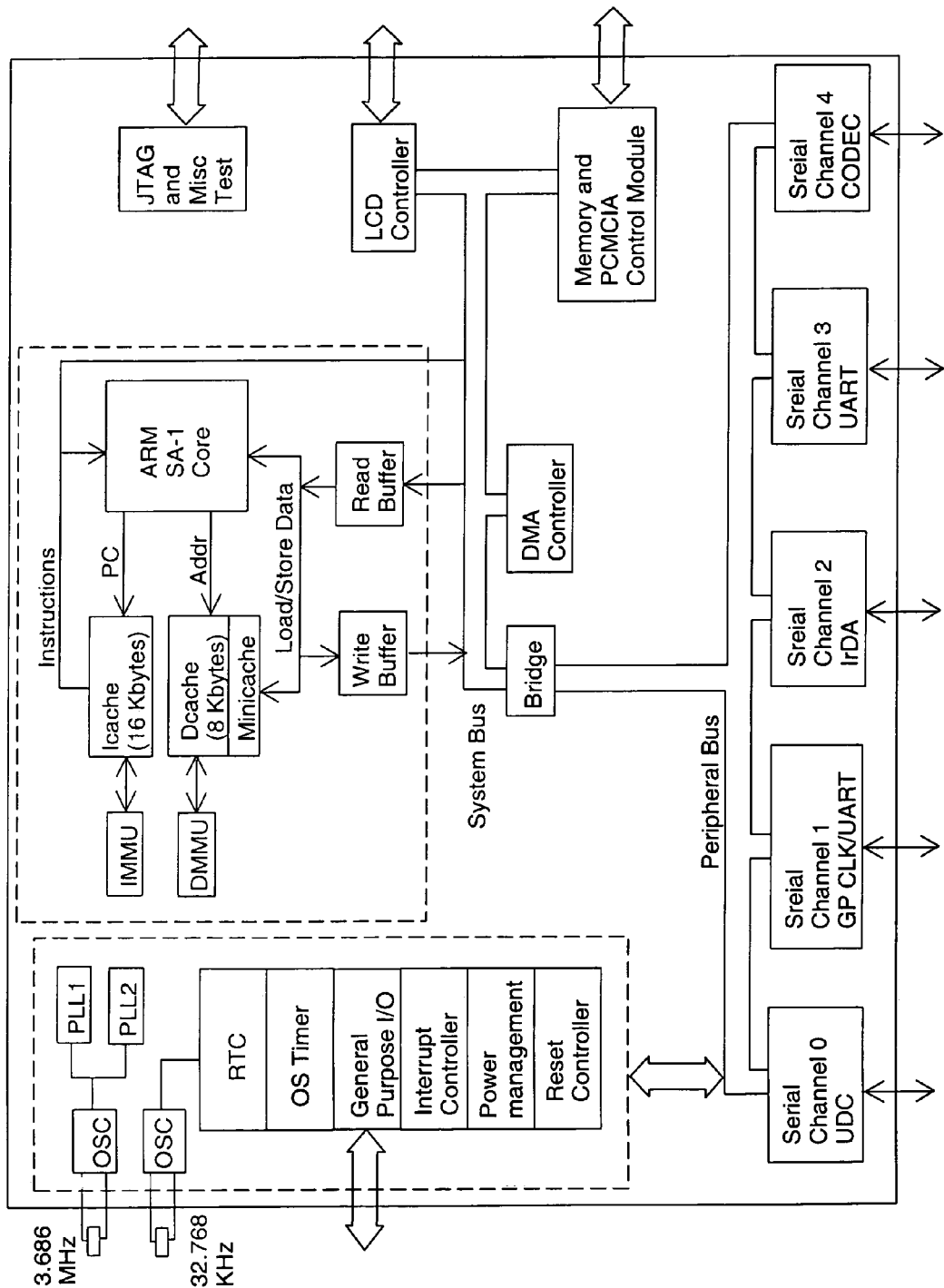
FIG. 12 is a block diagram of an Intel strongARM processor.

One preferred embodiment uses the Intel StrongARM PDA microprocessor, however, another popular PDA microprocessor, the Motorolla DragonBall may also be used. Even though Intel and Motorola microprocessors are disclosed here, it will be apparent to one skilled in the art, that microprocessors from numerous other vendors may be configured to the current application. A block diagram of the Intel StrongARM microprocessor is shown in FIG. 12. The Intel microprocessor is typically used in devices running Windows CE, and the Motorola is used with devices running the Palm OS operating system. The ARM microprocessor core has a very well accepted architecture and numerous key semiconductor and system partners.

Shown in conjunction with FIG. 12, the StrongARM has five serial channels used to communicate with peripheral devices.

- Channel 0: User datagram protocol (UDP) is a connectionless protocol that, like transmission control protocol (TCP), runs on top of Internet protocol (IP) networks. Unlike TCP/IP, UDP/IP provides very few error recovery services, offering instead a direct way to send and receive datagrams over an IP network. It is used primarily for broadcasting messages over a network. A datagram is a piece of a message transmitted over a packet-switching network, and is a packet of information that contains the destination address in addition to data.
- Channel 1: GPCLK/UART—This channel can be used as a general purpose clock (GPCLK) or universal asynchronous receiver-transmitter (UART).
- Channel 2: Infrared Data Association (IrDA) is a group of device manufacturers that developed a standard for transmitting data via IR light waves. IrDA ports support roughly the same transmission rates as traditional parallel ports. The only restrictions on their use are that the two devices must be within a few feet of each other, and there must be a clear line of sight between them.

Figure 13:
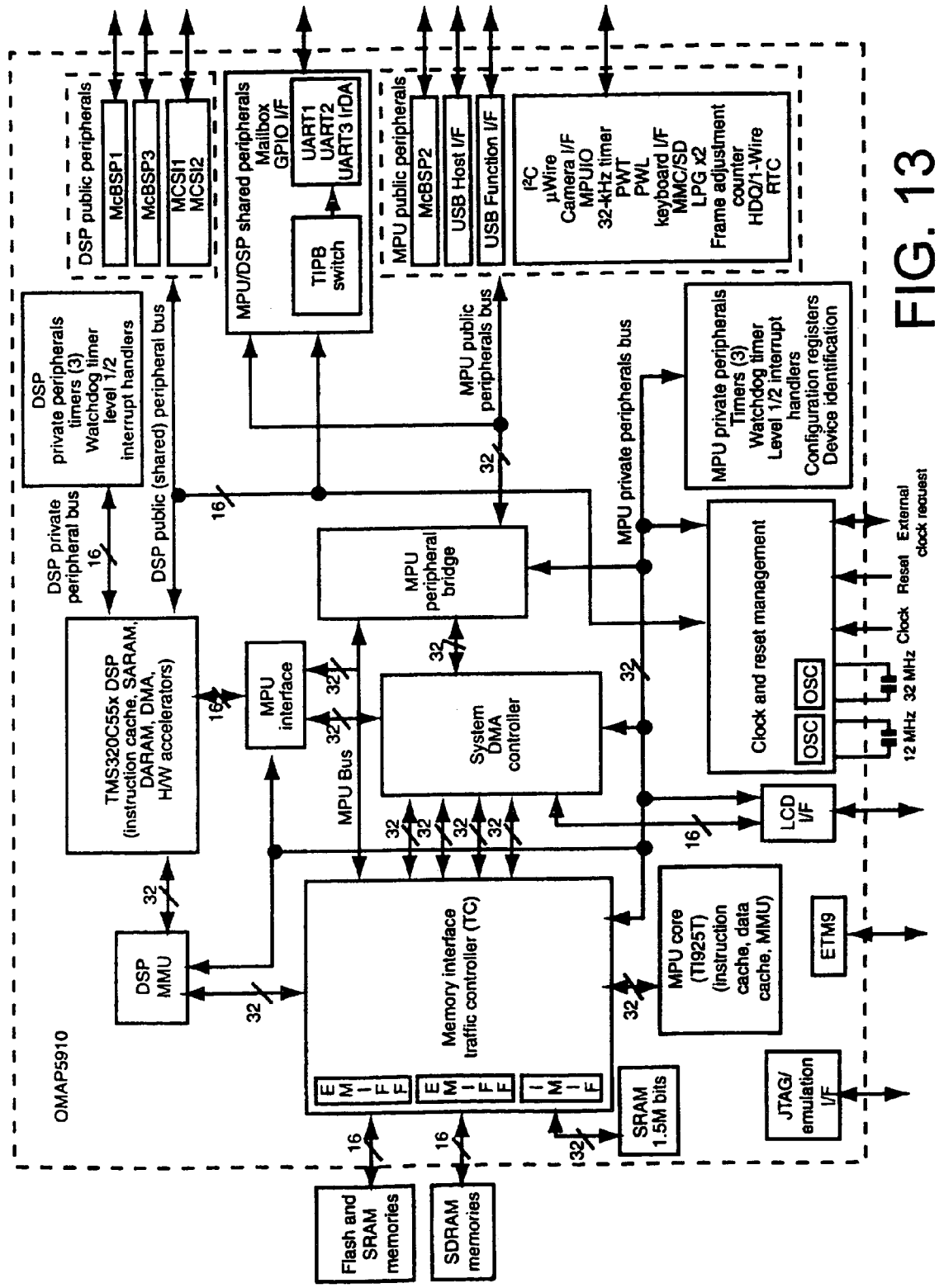
FIG. 13 is a block diagram of an extensively integrated OMAP chip.

Channel 3: Universal asynchronous receiver-transmitter (UART):

Example of another microprocessor that may be used is OMAP processor from Texas Instruments. It is an enhanced ARM-based processor, and FIG. 13 shows a block diagram of this extensively integrated OMAP microchip. ARM-based microprocessors can also be used in Palm OS devices. The OMAP processor includes, TI-enhanced ARM9 up to 175 MHz TMS 320C55xDSP up to 200 MHz Optimized software architecture that allows designers to leverage dual processing, and provides a complete and seamless software foundation.

DSP/BIOS Bridge that provides a seamless interface to the DSP using standard APIs allowing easy access to DSP multimedia algorithms.

Open platform that enables a large network of independent developers to provide a broad range of OMAP compatible software solutions.

MMC-SD support

Blutooth interface, and

Small, 289-pin MicroStar BGA package eases design in space-constrained devices.

Configuring any of these microprocessors for the current application is well known to those skilled in the art.

Figure 14:
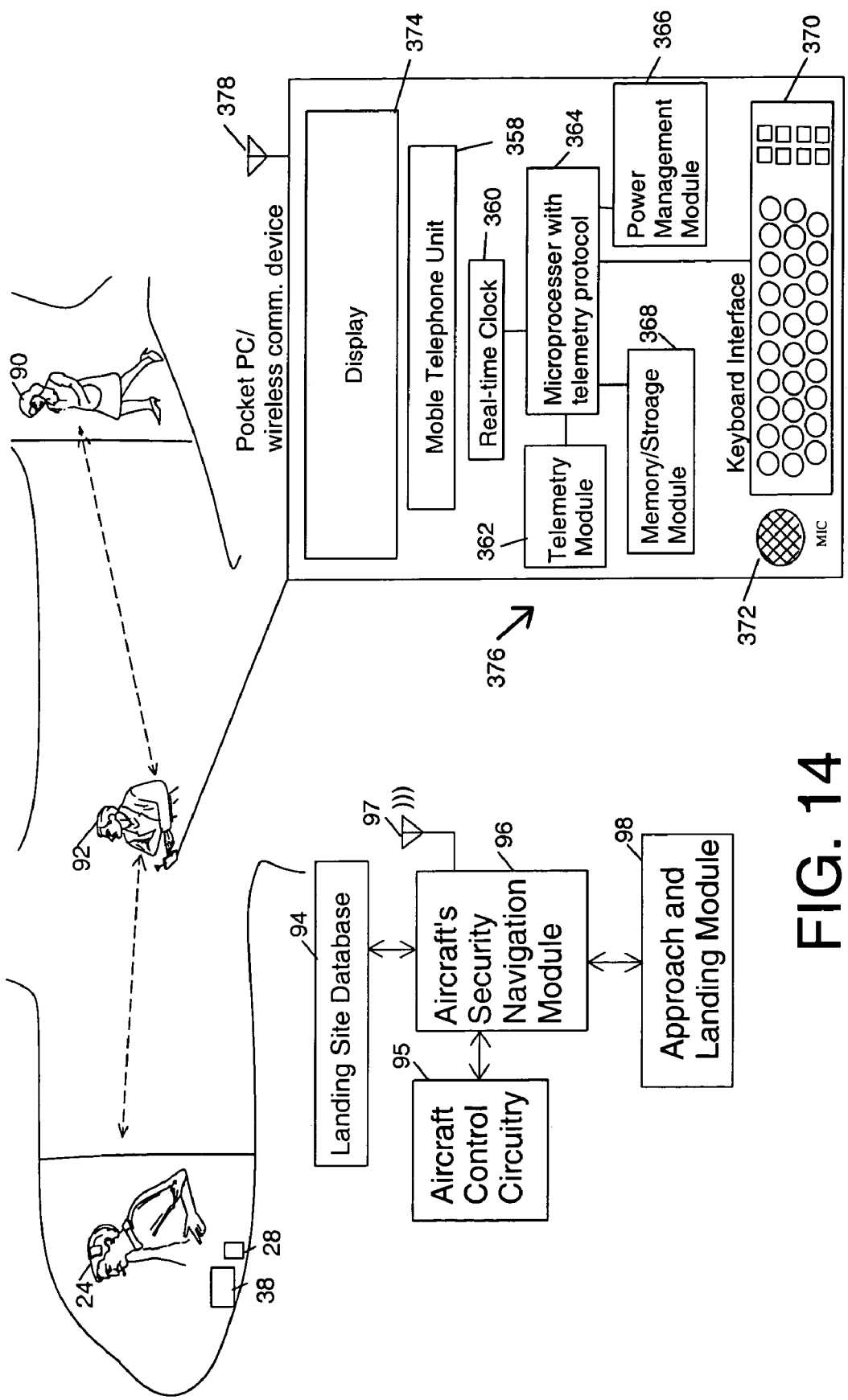
FIG. 14 is a schematic diagram showing aircraft's security navigation module that can be activated with the pocket PC/wireless communication device from anywhere in the plane.

In one aspect of the invention, shown in conjunction with FIG. 14, the WCD 376 can be used to activate aircraft's security navigation module. In an extreme situation, if the cockpit is compromised, or if the pilots are incapacitated, an air-marshal would be able to activate aircraft's security navigation module, whereby the plane will be safely guided back, and safely land at the nearest appropriate airport. Details of automatic vehicle control and guidance are provided in the Pipinger patent (U.S. Pat. No. 6,584,383), which is included here in its entirety by reference.

Figure 15:
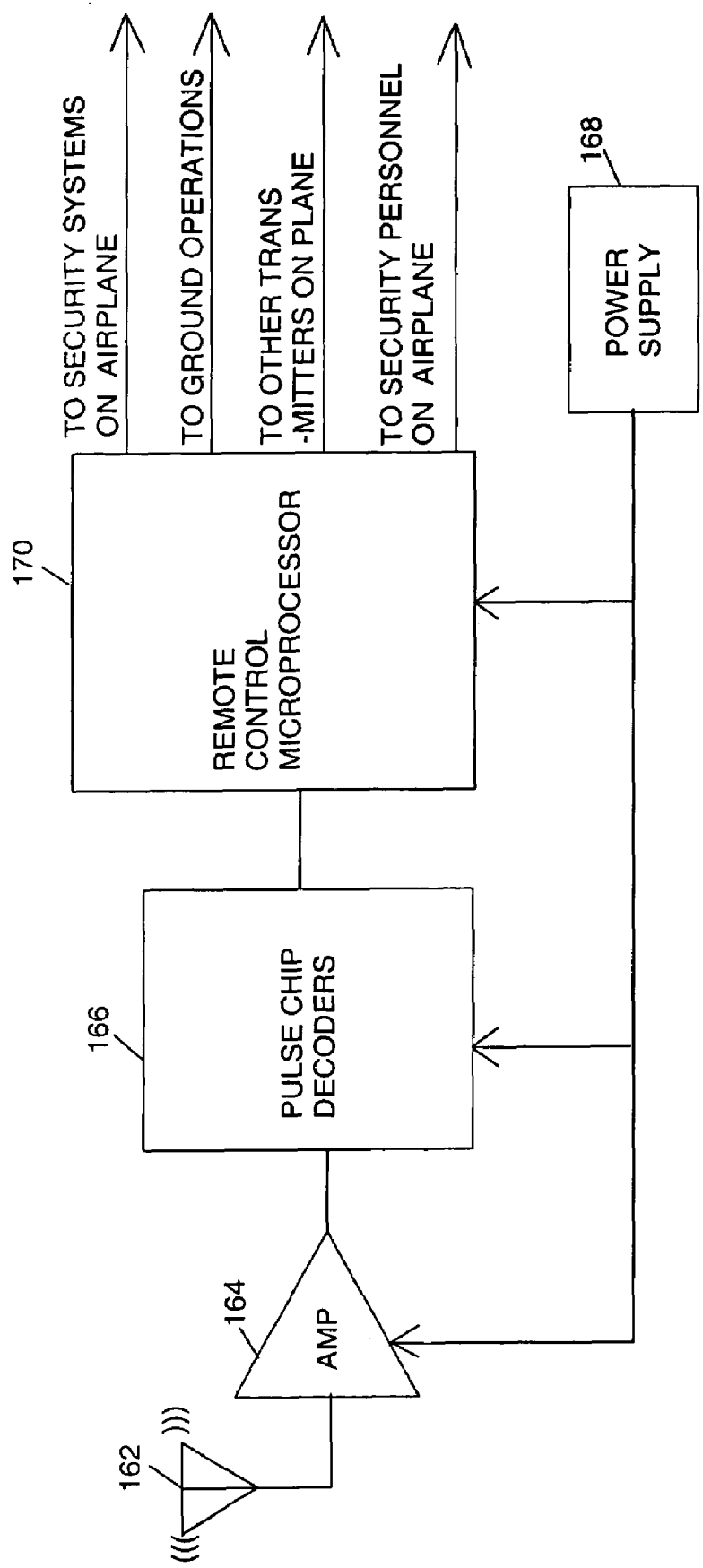
FIG. 15 is a general schematic block diagram of the wireless receiver.

Shown in conjunction with FIG. 15, an antenna 162 on the receiver side receives these encoded radiofrequency pulses, which are amplified 164 and decoded 166. The main receiver and circuitry being located at the control panel 28 in the cockpit (but can be anywhere in the plane). Microprocessor circuitry 170 deciphers and routes the action of the pulses. It should be clear that the WCD 376 can be used either as a communication device or for activation/control of defense measures. In one example, a high level encoded security message would automatically be transmitted from the control panel 28 of the airplane to ground operations 37, and simultaneously any other additional measures would also be activated.

The wireless transmitter is password and code protected with software lockouts. For example a security marshal on the plane will have access to turn on laser guns, whereas a flight attendant will have a more limited access to security defense systems.

Although certain preferred embodiments and methods have been disclosed herein, it will be apparent from the foregoing disclosure to those skilled in the art that variations and modifications of such embodiments and methods may be made without departing from the true spirit and scope of the invention. Accordingly, it is intended that the invention shall be limited only to the extent required by the appended claims and the rules and principles of applicable law.

We claim:

1. A system to provide i) wireless remote control of anti-hijacking system(s) aboard an airplane, and ii) 2-way or 3-way communication among crew members and ground personnel, from aboard an airplane, comprising:
    a) at least one wireless transmitter means comprising microprocessor based circuitry and telemetry means to transmit data;
    b) at least one wireless receiver means to receive said data from said transmitting means;
    c) software means and protocols adapted for said communication among crew members and ground personnel, wherein said communication can comprise numerically encoded messages; and
    d) capability to activate a code or sequence based on perceived threat for said anti-hijacking system(s) and/or communication among said crew members and ground personnel.

2. The system of claim 1, wherein said transmitting means can operate using operating software based on at least one of Microsoft Windows, Linux, Palm OS, Java OS, and SYMBIAN.

3. The system of claim 1, wherein said transmitter means is comprised in a hand-held unit.

4. The system of claim 1, wherein said transmitter means is comprised in a wrist-watch unit.

5. The system of claim 1, wherein said transmitter means is a modified pocket PC.

6. A wireless remote system for activation and control of anti-hijacking defense measures installed aboard an aircraft, comprising:
    a) anti-hijacking defense measures having control circuitry; wherein such measures comprise at least of one of aerosol chemical sprays, releasing gases, fogging, spraying sticky glue, firing laser guns and sounding alarm;
    b) wireless transmitter means for one of activating, controlling said anti-hijacking defense measures;
    c) wireless receiver means connected to control circuitry of said anti-hijacking defense measures; and
    d) manually activating and/or controlling said anti-hijacking defense measures wirelessly, by a flight crew member or an air-marshal aboard said airplane.

7. The A system of claim 6, wherein said wireless remote control of said anti-hijacking system(s), comprises activation, increasing level, decreasing level, and shutting-off, said at least one anti-hijacking system(s).

8. The system of claim 6, wherein said transmitter means can operate a pre-programmed sequence of said anti-hijacking system(s).

9. The system of claim 6, wherein said transmitter means comprises telemetry means to communicate among crew members and ground operations, and at least one transmitter.

10. The system of claim 6, wherein said transmitter means can selectively operate said anti-hijacking system(s) in different sections of said airplane.

11. The system of claim 6, wherein said transmitter means can simultaneously operate more than one said anti-hijacking system(s).

12. The system of claim 6, wherein said transmitter means can sequentially operate said anti-hijacking system(s).

13. The system of claim 6, wherein said transmitter means can activate auto flight navigation system.

14. The system of claim 6, wherein said transmitter means can operate using operating software based on at least one of Microsoft Windows, Linux, Palm OS, Java OS, and SYMBIAN.

15. A method of wireless communication between flight crew and/or wireless remote control of anti-hijacking system(s) aboard an airplane, wherein said anti-hijacking systems comprises at least one of aerosol chemical spraying, releasing gases, fogging, spraying sticky glue, firing laser guns, sounding alarm, comprising the steps of:
  a) providing at least one transmitter means aboard said aircraft to transmit commands for controlling said systems;
  b) providing at least one receiver means connected to the circuitry of said anti-hijacking systems;
  c) determining that a hijacking threat is imminent; and
  d) manually activating said wireless communication between flight crew and/or remotely activating/controlling said anti-hijacking systems.

16. The method of claim 15, wherein said wireless remote control of said anti-hijacking system(s), comprises activation, increasing level, decreasing level, and shutting-off, said at least one anti-hijacking systems, and 2-way or 3-way communication among flight crew and ground operations with respect to said anti-hijacking defense measures.

17. The method of claim 15, wherein said transmitter means further comprises telemetry means to communicate among crew members and ground operations.

18. The method of claim 15, wherein said transmitter means can selectively operate said anti-hijacking systems in different sections of said airplane.

19. The method of claim 15, wherein said transmitter means can simultaneously operate more than one said anti-hijacking system(s).

20. The A method of claim 15, wherein said transmitter means can sequentially operate said anti-hijacking system(s).

21. The method of claim 15, wherein said transmitter means can activate auto flight navigation system.

22. The method of claim 15, wherein said transmitting means can operate using operating software based on at least one of Microsoft Windows, Linux, Palm OS, Java OS, and SYMBIAN.

* * * * *